United States Patent
Yi et al.

(10) Patent No.: US 9,078,126 B2
(45) Date of Patent: Jul. 7, 2015

(54) METHOD OF SHARING A SESSION KEY BETWEEN WIRELESS COMMUNICATION TERMINALS USING A VARIABLE-LENGTH AUTHENTICATION CODE

(75) Inventors: Jeong Hyun Yi, Gyeonggi-do (KR); Gun-Il Ma, Seoul (KR); Hyeong Chan Lee, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 78 days.

(21) Appl. No.: 14/000,645

(22) PCT Filed: Apr. 6, 2012

(86) PCT No.: PCT/KR2012/002644
§ 371 (c)(1),
(2), (4) Date: Aug. 21, 2013

(87) PCT Pub. No.: WO2012/148096
PCT Pub. Date: Nov. 1, 2012

(65) Prior Publication Data
US 2013/0332739 A1    Dec. 12, 2013

(30) Foreign Application Priority Data
Apr. 26, 2011   (KR) .................. 10-2011-0038900

(51) Int. Cl.
*H04L 29/00*   (2006.01)
*H04W 12/04*   (2009.01)
*H04L 9/08*   (2006.01)

(52) U.S. Cl.
CPC ............. *H04W 12/04* (2013.01); *H04L 9/0841* (2013.01); *H04L 2209/80* (2013.01)

(58) Field of Classification Search
CPC ... H04L 2209/80; H04L 65/1079; H04L 9/08; H04W 12/04

USPC ................................... 713/150, 171; 708/135
See application file for complete search history.

(56) References Cited

U.S. PATENT DOCUMENTS 4,089,125 A * 5/1978 Enz et al. .................... 434/324
6,920,559 B1 * 7/2005 Nessett et al. ................ 713/168

(Continued)

FOREIGN PATENT DOCUMENTS

KR   10-2005-0087815 A    8/2005
KR       10-0571820 B1    4/2006

OTHER PUBLICATIONS

International Search Report for PCT/KR2012/002644 mailed Oct. 30, 2012 from Korean Intellectual Property Office.

(Continued)

*Primary Examiner* — Hadi Armouche
*Assistant Examiner* — Sakinah Taylor
(74) *Attorney, Agent, or Firm* — Sherr & Jiang, PLLC (57) ABSTRACT

Disclosure relates to a method of sharing a session key between wireless communication terminals using a variable-length authentication code. The method includes: generating a public key by using an own private key; generating a message including the public key and a first random number and encoding the message using an own secret key to exchange an encrypted message with the other terminal; decoding the encrypted message of the other terminal by receiving a secret key of the other terminal; generating an authentication code by calculating the first random number and a second random number included in the decoded message; obtaining a medium value from the authenticated code; and generating a session key by using a public key included in the decoded message of the other terminal.

4 Claims, 9 Drawing Sheets

(56) References Cited

U.S. PATENT DOCUMENTS

| | | | |
|---|---|---|---|
| 8,600,063 B2 * | 12/2013 | Fukuda | 380/282 |
| 8,627,088 B2 * | 1/2014 | Mizrah | 713/176 |
| 2003/0163719 A1 * | 8/2003 | Ebihara | 713/193 |
| 2004/0165726 A1 | 8/2004 | Yamamichi et al. | |
| 2005/0084114 A1 | 4/2005 | Jung et al. | |
| 2009/0068985 A1 * | 3/2009 | Nguyen et al. | 455/411 |
| 2009/0222659 A1 * | 9/2009 | Miyabayashi et al. | 713/156 |
| 2010/0104094 A1 * | 4/2010 | Takashima | 380/28 |
| 2011/0202982 A1 * | 8/2011 | Alexander et al. | 726/7 |
| 2013/0243187 A1 * | 9/2013 | Horstmeyer et al. | 380/28 |

OTHER PUBLICATIONS

Eunah Kim et al, Providing Secure Mobile Device Pairing Based on Visual Confirmation, IEEE 13th International Symposium on Consumer Electronics, May 25, 2009, pp. 676-680.

Gun Il Ma et al, Performance evaluation of device pairing techniques for establishing secure session using . . . , 2010 South Korea Computer Congress Litigation, pp. 95-100, vol. 37.

\* cited by examiner

METHOD OF SHARING A SESSION KEY BETWEEN WIRELESS COMMUNICATION TERMINALS USING A VARIABLE-LENGTH AUTHENTICATION CODE

CROSS REFERENCE TO PRIOR APPLICATION

This application is a National Stage Patent Application of PCT International Patent Application No. PCT/KR2012/002644 (filed on Apr. 6, 2012) under 35 U.S.C. §371, which claims priority to Korean Patent Application No. 10-2011-0038900 (filed on Apr. 26, 2011), which are all hereby incorporated by reference in their entirety.

TECHNICAL FIELD

The present invention relates to a method of sharing a session key between wireless communication terminals using a variable-length authentication code, and more particularly, to a method of sharing a session key between wireless communication terminals using a variable-length authentication code, whereby the session key can be shared in a state in which high security between near-distance wireless communication terminals is maintained.

BACKGROUND ART

Popularization of smartphones results in quantitative and qualitative expansion of applications that utilize mobility and computing capability of the smartphones. A payment service application using a mobile phone among many mobile applications has been spotlighted as service that may give much convenience to users. In the payment service application, various payment means, such as a mobile wallet, are integrated in one application so that various payment services can be conveniently provided to users through a smartphone. There are several payment methods using the smartphone, but a payment service of the mobile wallet is carried out through wireless communication between various near-distance wireless terminals. However, wireless communication is basically vulnerable to attack. Thus, a secure session management technique between near-distance terminals is positively necessary to carry out various services using a mobile terminal.

A technique of sharing a secret key between both communication terminals is necessary for secure session management. The most known method of sharing a secret key is a Diffie-Hellman (DH) protocol, which is vulnerable to man-in-the-middle attack. Many key exchanging techniques including a station-to-station (STS) protocol have been proposed so as to solve the problem of man-in-the-middle attack. However, since these key exchanging techniques including a STS protocol require a previously-shared value or a trusted third party (TTP), they are not suitable for use in a mobile payment service. This is because it is difficult for a payment service using a mobile phone to have a previously-shared value with various communication terminals or to have a common TTP, such as a Public Key Infrastructure (PKI).

In addition, when a hash value relating to a shared key (session key) established through a DH protocol is used as an authentication code, the size of the authentication code is too large to be used in an out-of-band (OOB) channel, and the hash value is vulnerable to pre-image attack.

DETAILED DESCRIPTION OF THE INVENTION

Technical Problem

The present invention provides a method of sharing a session key between wireless communication terminals using a variable-length authentication code, whereby the session key can be shared in a state in which high security between near-distance wireless communication terminals is maintained.

Technical Solution

According to an aspect of the present invention, there is provided a method of sharing a session key between wireless communication terminals based on a Diffie-Hellman (DH) protocol, the method including: generating a public key by using an own private key; generating a message including the public key and a first random number and encoding the message using an own secret key to exchange an encrypted message with the other terminal; decoding the encrypted message of the other terminal by receiving a secret key of the other terminal; generating an authentication code by calculating the first random number and a second random number included in the decoded message; obtaining a medium value from the authenticated code; and generating a session key by using a public key included in the decoded message of the other terminal.

The message may further include an identifier and a reflection attack verification value.

The method may further include checking a reflection attack verification value of the other terminal included in the decoded message.

The secret key may be a disposable key, and the first and second random numbers may be comprised of bit streams having a value of 0 or 1.

The generating of the authentication code may include generating an authentication code by performing an exclusive OR operation on the first random number and the second random number.

The authentication code may be divided into n bits (where n is a natural number of 2 or more), the divided authentication code may correspond to one grid, and each grid may be indicated by one color.

The obtaining of the medium value from the authentication code may include: dividing the authentication code into 2 or more bits and inputting the divided authentication code to an out-of-band (OOB) function to obtain the medium value; and displaying the medium value on a screen including a plurality of grids.

The number S' of grids required to display the medium value may be obtained by the following equation:

$$S' = \frac{S}{\log_2 k},$$

where S is the number of grids required when the number of colors for displaying the medium value is 2, k is the number of colors used to display the medium value and is $2^m$ (where m is a number of bits to the divided authentication code).

The obtaining of the medium value from the authentication code may include: inputting the authentication code to an OOB function to obtain the medium value; and controlling a plurality of light emitting diodes (LEDs) to turn on or off according to the medium value.

The obtaining of the medium value from the authentication code may include: inputting the authentication code to an OOB function to obtain the medium value; and playing a stored sound source file according to the medium value.

According to another aspect of the present invention, there is provided a wireless communication terminal for sharing a session key with the other terminal based on a Diffie-Hellman (DH) protocol, the wireless communication terminal including: a storage unit including a public key generated by using an own private key; an encoding unit generating a message including the public key and a first random number and encoding the message using an own secret key to exchange an encrypted message with the other terminal; a decoding unit decoding the encrypted message of the other terminal by receiving a secret key of the other terminal; an authentication code generating unit generating an authentication code by calculating the first random number and a second random number included in the decoded message; an out-of-band (OOB) converting unit obtaining a medium value from the authenticated code; and a session key generating unit generating a session key by using a public key included in the decoded message of the other terminal.

Effects of the Invention

As described above, according to the present invention, since an authentication code having a short length is used, increased usability can be expected when an authentication technique is used through an OOB channel. In addition, since adjustment of the length of the authentication code is flexible, the length of the authentication code can be adjusted according to a level of a security need of an application so that a compromise effect of usability and security can be attained. Furthermore, various authentication methods, such as a comparing color barcode (CCB) method, a comparing multi LEDs (CML) method, and a comparing music (CM) method, are provided according to various usage environments of a wireless communication terminal so that direct session key authentication can be more easily performed.

BEST MODE OF THE INVENTION

The present invention will now be described more fully with reference to the accompanying drawings, in which exemplary embodiments of the invention are shown, so that one of ordinary skill in the art can easily embody the invention.

Figure 1:
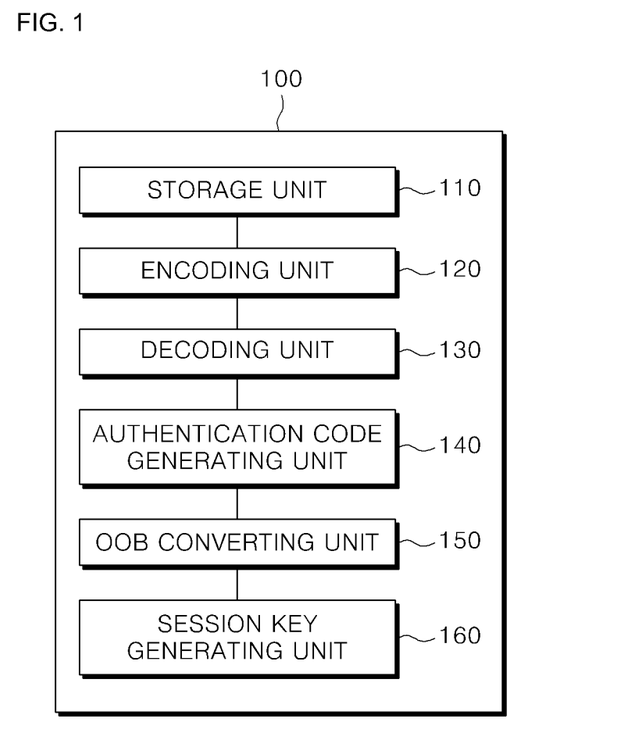
FIG. 1 is a view illustrating a structure of a wireless communication terminal according to an embodiment of the present invention.

FIG. 1 is a view illustrating a structure of a wireless communication terminal according to an embodiment of the present invention. A wireless communication terminal 100 illustrated in FIG. 1 that is a device for sharing a session key between near-distance wireless communication terminals may refer to a mobile station (MS), a mobile terminal (MT), a subscriber station (SS), a portable subscriber station (PSS), user equipment (UE), or an access terminal (AT) or may include functions of all or part of the MT, the SS, the PSS, and the UE.

The wireless communication terminal 100 according to the current embodiment of the present invention includes a storage unit 110, an encoding unit 120, a decoding unit 130, an authentication code generating unit 140, an out-of-band (OOB) converting unit 150, and a session key generating unit 160.

The storage unit 110 stores a public key, an identifier identification (ID), a random number, and a secret key, which are generated using an own private key of the wireless communication terminal 100, and stores the random number and the secret key that are randomly selected.

The encoding unit 120 generates a message including an attack verification value, the identifier ID, the public key, and the random number, and encodes the generated message by using an own secret key to exchange the encrypted message with an encrypted message of the other terminal. In this case, a symmetric-key encryption algorithm is used to transmit values of the random number and the public key.

The decoding unit 130 decodes the encrypted message of the other terminal by using a received secret key of the other terminal and authenticates the attack verification value of the decoded message. The authentication code generating unit 140 generates an authentication code by calculating a random number of the other terminal included in the decoded message and an own random number.

Here, the authentication code generating unit 140 uses an exclusive OR value of the random number as the authentication code, instead of a hash value of a shared key (session key).

The OOB converting unit 150 obtains a medium value by applying the authentication code to an OOB function. Here, color barcodes are used to perform a method of authenticating the medium value between two terminals, whereby the session key can be authenticated by simply comparing coidentity of the color barcodes, not by recognizing the medium value through a camera module, like in an existing black-and-white barcode.

The session key generating unit 160 generates a session key by using a public key of the other terminal included in the decoded message.

Figure 2:
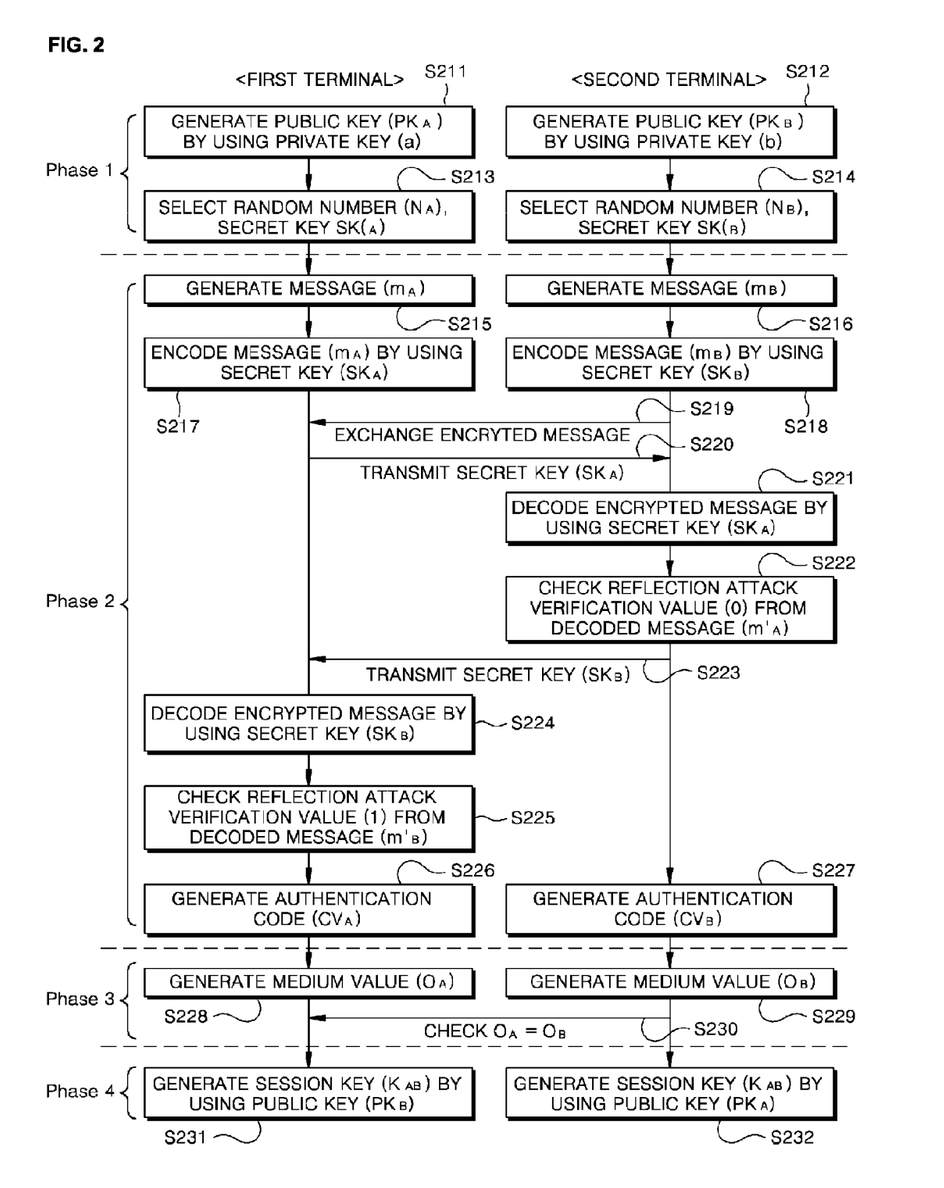
FIG. 2 is a flowchart illustrating a method of setting a session key between wireless communication terminals according to an embodiment of the present invention.
Figure 3:
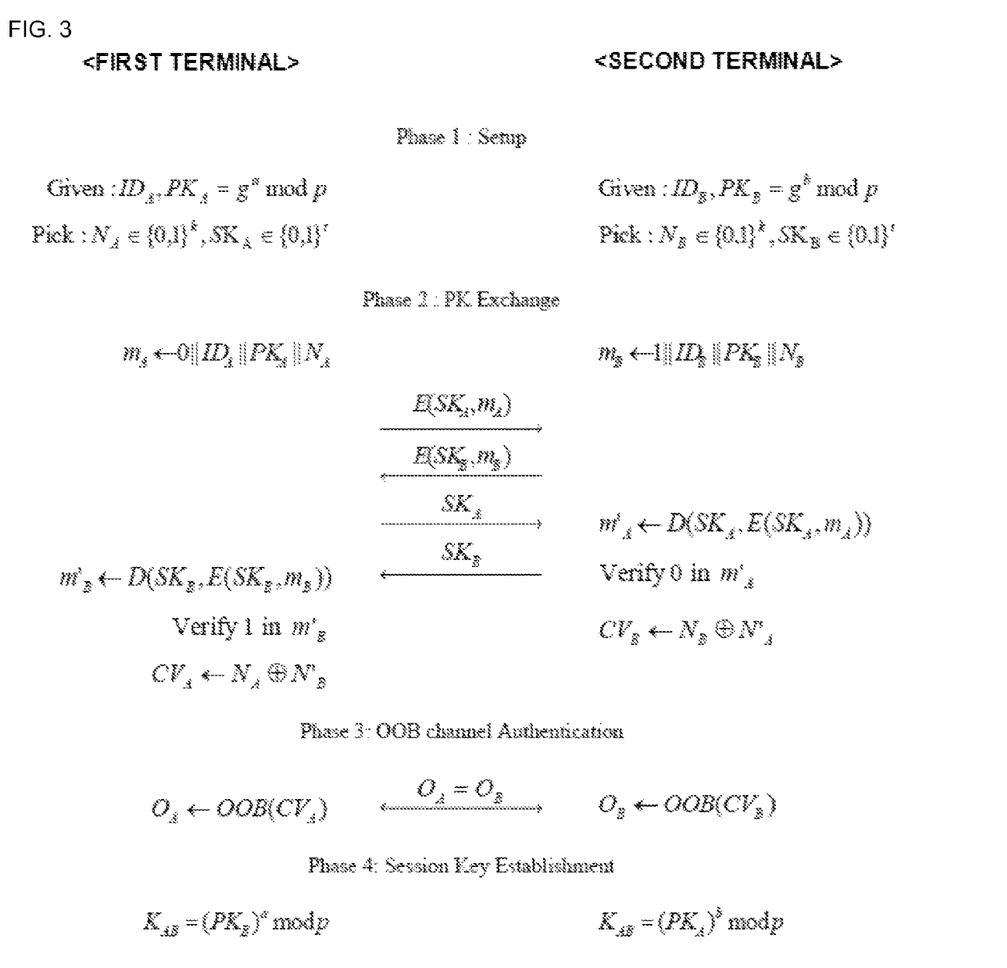
FIG. 3 is a flowchart illustrating the method of setting a session key between wireless communication terminals illustrated in FIG. 2 in more detail.

FIG. 2 is a flowchart illustrating a method of setting a session key between wireless communication terminals according to an embodiment of the present invention, and FIG. 3 is a flowchart illustrating the method of setting a session key between wireless communication terminals illustrated in FIG. 2 in more detail. For convenience of explanation, in FIGS. 2 and 3, wireless communication terminals according to the current embodiment of the present invention are represented by a first terminal and a second terminal, and the first terminal and the second terminal are terminals that perform near field communication (NFC) by using Zigbee, RFID, Bluetooth based on the Diffie-Hellman (DH) protocol.

First, in Phase 1, identifier IDs, e.g., e-mail addresses that a human being can identify and DH public key values $PK_A$ and $PK_B$ are set in the first terminal and the second terminal (S211, S212). Here, the identifier IDs set in the first terminal and the second terminal may be represented by $ID_A$ and $ID_B$, as illustrated in FIG. 3. Also, the DH public key value $PK_A$ set in the first terminal is generated using a private key (a) of the first terminal ($g^a mod p$), and the DH public key value $PK_B$ set in the second terminal is generated using a private key (b) of the second terminal ($g^b mod p$).

Also, the first terminal and the second terminal select k-bit random numbers $N_A$ and $N_B$ and t-bit disposable secret keys $SK_A$ and $SK_B$ randomly (S213, S214). Here, since the random numbers $N_A$ and $N_B$ are comprised of k bit steams having a bit value of 0 or 1, the random numbers $N_A$ and $N_B$ comprised of various bit streams can be generated by adjusting a k-value. Also, the disposable secret keys $SK_A$ and $SK_B$ are comprised of t bit streams having a bit value of 0 or 1, and values of the disposable secret keys $SK_A$ and $SK_B$ may vary frequency.

Next, in public key exchanging (Phase 2), the first terminal and the second terminal generate messages $m_A$ and $m_B$ so as to exchange the public key values $PK_A$ and $PK_B$ with each other (S215, S216).

Here, the messages $m_A$ and $m_B$ include an attack verification value (0 or 1) for verifying a reflection attack, own IDs $ID_A$ and $ID_B$, own public key values $PK_A$ and $PK_B$, and own random numbers $N_A$ and $N_B$. The message $m_A$ generated by the first terminal may be represented by $0\|ID_A\|PK_A\|N_A$, and the message $m_B$ generated by the second terminal may be represented by $1\|ID_B\|PK_B\|N_B$. Here, a reflection attack verification value 0 means a transmission terminal, and a reflection attack verification value 1 means a receipt terminal.

Next, the first terminal and the second terminal encode the generated messages $m_A$ and $m_B$ by using own secret keys $SK_A$ and $SK_B$ (S217, S218). The first terminal and the second terminal exchange messages $E(SK_A, m_A)$ and $E(SK_B, m_B)$ that are encoded by the secret keys $SK_A$ and $SK_B$, with each other (S219).

The first terminal transmits own secret key $SK_A$ to the second terminal, if it receives the encrypted message $E(SK_B, m_B)$ from the second terminal (S220). The second terminal that receives the secret key $SK_A$ of the first terminal decodes the encrypted message $E(SK_A, m_A)$ by using the secret key $SK_A$ ($D(SK_A, E(SK_A, m_A))$ (S221).

After the second terminal checks whether a reflection attack verification value of 0 is present in a decoded message $m'_A$ (S222), if it is checked that the reflection attack verification value of 0 is present in the decoded message $m'_A$, the second terminal transmits own secret key $SK_B$ to the first terminal (S223).

The first terminals that receives the secret key $SK_B$ of the second terminal decodes the encrypted message $E(SK_B, m_B)$ by using the secret key $SK_B$ ($D(SK_B, E(SK_B, m_B))$ (S224). The first terminal checks whether a reflection attack verification value of 1 is present in a decoded message $m'_B$ (S225).

In this way, if the first terminal and the second terminal succeed in reflection attack verification, the first terminal and the second terminal calculate their own random number values and transmitted random number values to generate authentication codes (S226, S227). That is, the second terminal calculates an own random number value $N_B$ and a random number value $N'_A$ received from the first terminal to generate an authentication code $CV_B$, and the first terminal calculates an own random number value $N_A$ and a random number value $N'_B$ received from the second terminal to generate an authentication code $CV_A$. According to an embodiment of the present invention, the authentication code generating unit 140 calculates random number values by using exclusive OR.

In OOB channel authentication (Phase 3), the first terminal and the second terminal apply the authentication codes $CV_A$ and $CV_B$ to an OOB function so as to generate medium values $O_A$ and $O_B$ of an OOB channel that a user can directly recognize visually or auditorily (S228, S229). That is, the first terminal applies the authentication code $CV_A$ to the OOB function to obtain the output medium value $O_A$, and the second terminal applies the authentication code $CV_B$ to the OOB function to obtain the output medium value $O_B$.

Then, a user of the first terminal and a user of the second terminal compare the output medium values $O_A$ and $O_B$ of the OOB channel with each other and determine whether they are identical to each other, and if it is determined that they are identical to each other, the user of the first terminal and the user of the second terminal authenticate that public keys of the first and second terminals have been normally exchanged with each other (S230). Here, the OOB channel includes a visual channel and an auditory channel that use a visual sense and an auditory sense of the human being. When the OOB channel is an auditory channel, a medium value is represented by melody, music, and an effect sound, and when the OOB channel is a visual channel, a medium value is represented by a barcode and color.

As in the current embodiment of the present invention, according to paring technology using an OOB channel, since the human being can select a first terminal and a second terminal that are object terminals and can verify authentication information of the selected object terminals, it can be identified that an attacker modulates a message or counterfeits a device to be authenticated without a trusted third party (TTP).

Last, in session key installation (Phase 4), if authentication on public key exchange between the first terminal and the second terminal has succeeded, the first terminal and the second terminal generate a session key $K_{AB}$ between the first terminal and the second terminal and store the session key $K_{AB}$ together with a received ID of the other terminal as a pair (S231, S232).

That is, the first terminal generates a shared session key ($K_{AB}=(PK_B)^a mod p$) by using a received public key $PK_B$ of the second terminal, and the second terminal generates a shared session key ($K_{AB}=(PK_A)^b mod p$) by using a received public key $PK_A$ of the first terminal.

In this way, according to the current embodiment of the present invention, the first terminal and the second terminal can share the session key $K_{AB}$ by using a symmetric-key encryption algorithm based on the DH protocol, instead of hash.

In particular, according to the current embodiment of the present invention, in OOB channel authentication (Phase 3), one among a comparing color barcode (CCB) method, a comparing multi LEDs (CML) method, and a comparing music (CM) method can be utilized. Thus, a method of authenticating an OOB channel will now be described with reference to FIGS. 4 through 9.

Figure 4:
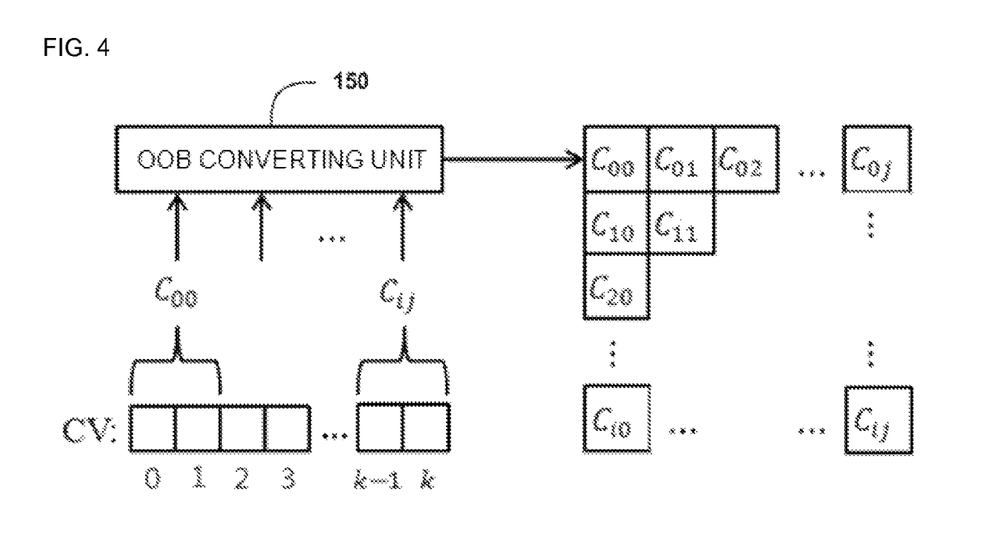
FIG. 4 is a view illustrating an operation of obtaining a medium value using a comparing color barcode (CCB) method by using an out-of-band (OOB) converting unit according to an embodiment of the present invention.

FIG. 4 is a view illustrating an operation of obtaining a medium value using a CCB method by using an OOB converting unit according to an embodiment of the present invention. In more detail, the left drawing of FIG. 4 shows an operation of applying an authentication code CV to an OOB function, and the right drawing of FIG. 4 shows that a medium value O is visually displayed on a screen of a terminal through an OOB visual channel. Here, the OOB function is a function to convert an input value into a medium value having a visual or auditory shape.

That is, as shown on the left bottom of FIG. 4, it is assumed that the authentication code CV is comprised of (k+1) bits (0~k). Then, the authentication code CV is divided into 2 bits and is input to the OOB converting unit 150 ($C_{00}$, $C_{01}$, $C_{02}$, ... $C_{ij}$), and the OOB to converting unit 150 represents an output medium value of the OOB function on a grid i×j through previously-designated four colors. For example, the OOB converting unit 150 may set 00-bit to red color 1, 01-bit to white color 2, 10-bit to blue color 3, and 11-bit to black color 4 and may display color corresponding to the authentication code CV that is divided into 2 bits and is input to the OOB converting unit 150 on a screen of the grid i×j. In this case, color selection may be performed to smoothly differentiate between colors based on the relationship of compensation color.

Here, the authentication code CV is divided into 2 or more bits, and when the authentication code CV is divided into m bits, the authentication code may be represented by $2^m$ colors. Also, as a m-value increases, the number or size of grids displayed on the screen may decrease. The divided authentication code CV is represented in one grid, and each grid is indicated by one color.

Thus, according to the related art, the authentication code CV is not divided and thus a medium value can be displayed by a black-and-white grid (or barcode) of two colors, whereas, according to an embodiment of the present invention, the authentication code CV is divided into 2 or more bits and thus the medium value can be displayed with various colors and the number or size of grids can be remarkably reduced.

That is, when the black-and-white grid is used, 0-bit is represented by black, and 1-bit is represented by white, whereas, when various colors like in the embodiment of the present invention are used, several bits can be represented by one color and thus the number of size of grids can be drastically reduced.

If the number of grids required to display the medium value by using the black-and-white grid, like in the related art, is S, the number S' of grids required to display the medium is reduced, as shown in Equation 1:

$$S' = \frac{S}{\log_2 k}, \quad (1)$$

where k is the number of colors used to display the medium value and is $2^m$ (where m is a number of bits to the divided authentication code CV) has a value of 2 or more.

Using so many colors enables reducing the number or size of color grids (or barcodes), but the user may undergo a difficulty in performing authentication. Thus, the user adjusts the number of grids and the number of colors appropriately so that convenience of a public key exchange authentication procedure can be achieved.

Figure 5:
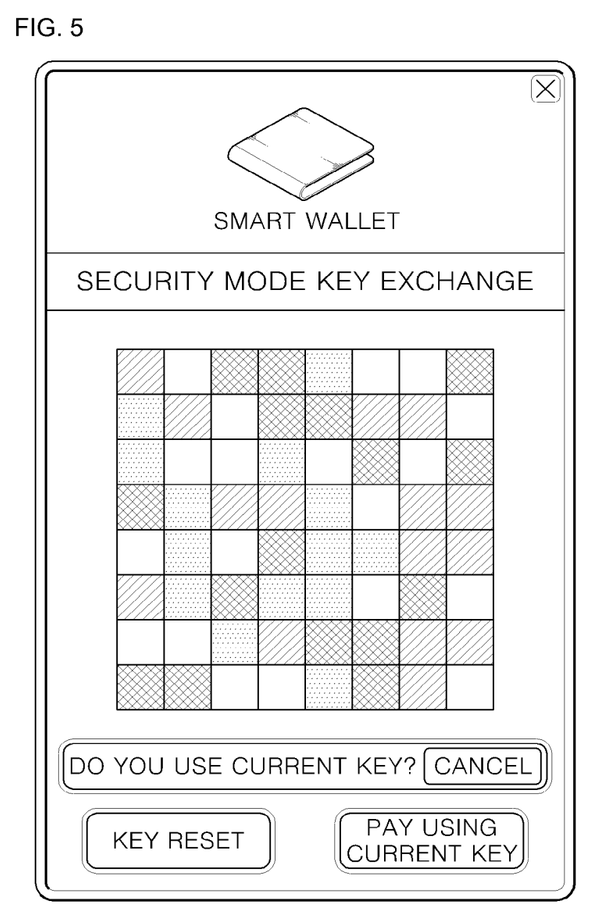
FIG. 5 is a view illustrating a state in which the medium value of an OOB function obtained using the operation of FIG. 4 is displayed on a screen.

FIG. 5 is a view illustrating a state in which the medium value of an OOB function obtained using the operation of FIG. 4 is displayed on a screen. In FIG. 5, the medium value of the OOB function is displayed on an operating screen when a random number having a length of 128 bits is used as the authentication code CV, by using four colors.

Thus, in the black-and-white grid according to the related art, 128 grids are required, whereas, when a color grid according to an embodiment of the present invention is used, the authentication code can be represented by using only 64 grids that is a half of 128 grids required in the related art, as checked from Equation 1.

In this way, according to an embodiment of the present invention, since an authentication code having a short length is used, increased usability can be expected when an authentication technique is used through the OOB channel. Also, since adjustment of the length of the authentication code is flexible, the length of the authentication code is adjusted according to a level of a security need of an application so that a compromise effect of usability and security can be attained. Also, since a color grid can be represented by the size or number of grids that is a half of the size or number of existing black-and-white grids, the user can perform session key authentication more easily.

Figure 6:
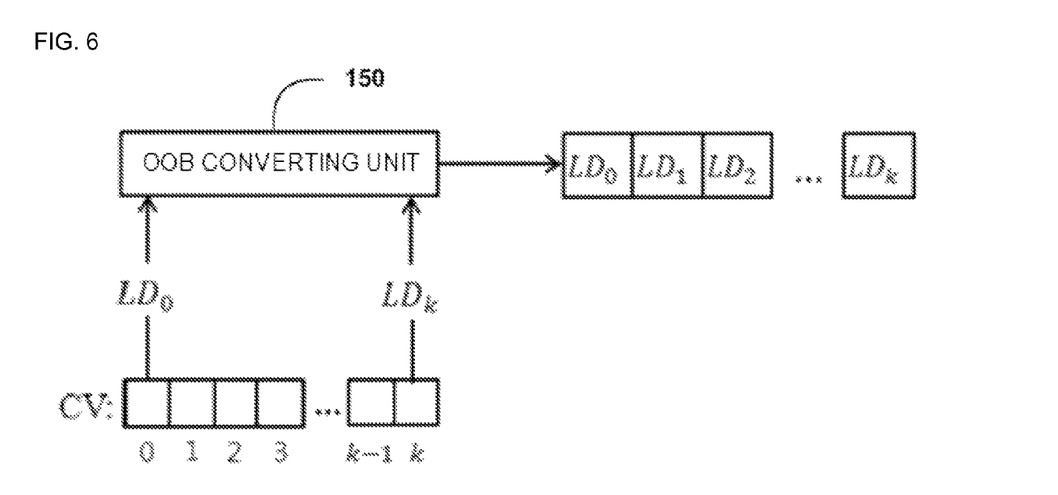
FIG. 6 is a view illustrating an operation of obtaining a medium value using a comparing multi LEDs (CML) method by using the OOB converting unit according to another embodiment of the present invention.

FIG. 6 is a view illustrating an operation of obtaining a medium value using a CML method by using the OOB converting unit according to another embodiment of the present invention. In more detail, the left drawing of FIG. 6 shows an operation of applying an authentication code CV to an OOB function, and the right drawing of FIG. 6 shows a case that a medium value O generated through an OOB visual channel flickers on an LED and is displayed thereon.

That is, according to the CML method, a wireless communication terminal having no display screen communicates with an external LED display device to represent a value of the authentication code CV by turning on or off the LED.

If the authentication code CV is input to the OOB converting unit 150, the OOB converting unit 150 extracts a k-bit authentication code from a least significant bit (LSB) by 1-bit to allocate the k-bit authentication code to turn-on and turn-off values of the LED. For example, the OOB converting unit 150 sets 1 of a bitstream to a turn-on value and 0 of the bitstream to a turn-off value.

Figure 7:
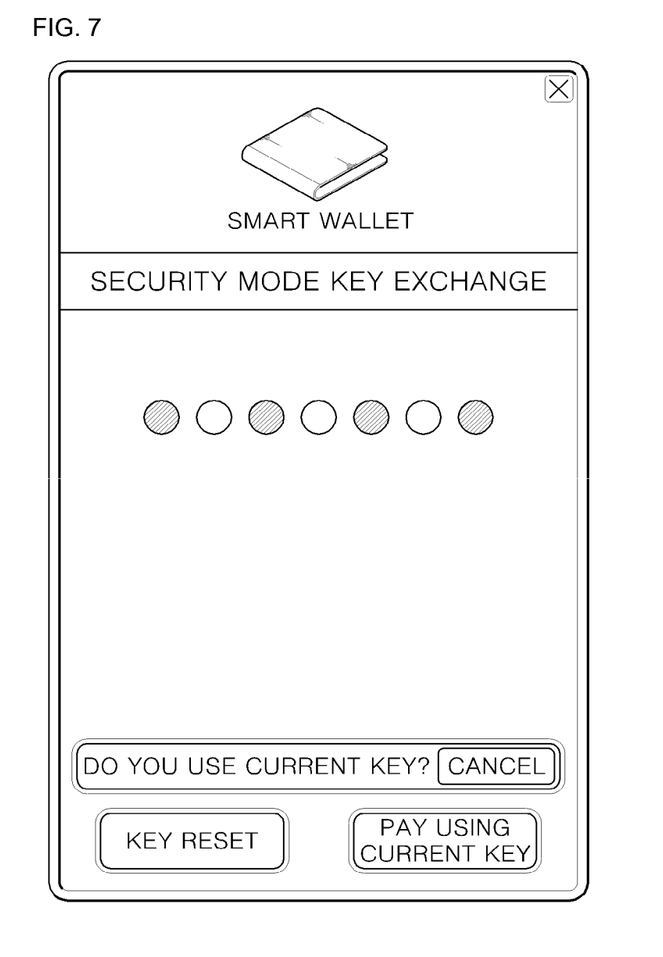
FIG. 7 is a view illustrating a state in which the medium value of an OOB function obtained using the operation of FIG. 6 is displayed on an LED.

FIG. 7 is a view illustrating a state in which the medium value of an OOB function obtained using the operation of FIG. 6 is displayed on an LED. The OOB converting unit 150 generates medium values $LD_0$, $LD_1$, ..., and $LD_K$ that are used to determine turning on/off of the LED and transmits the generated medium values $LD_0$, $LD_1$, ..., and $LD_K$ to an LED display device through serial communication. The LED display device turns on or off the LED according to a corresponding medium value. Thus, the user can conveniently check exchange of a session key only from a turn-on or turn-off state of the LED.

Figure 8:
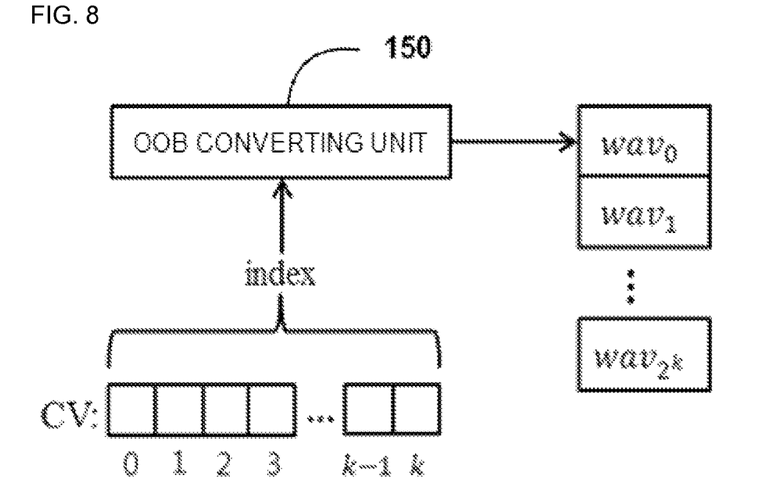
FIG. 8 is a view illustrating an operation of obtaining a medium value using a comparing music (CM) method by using the OOB converting unit according to another embodiment of the present invention.
Figure 9:
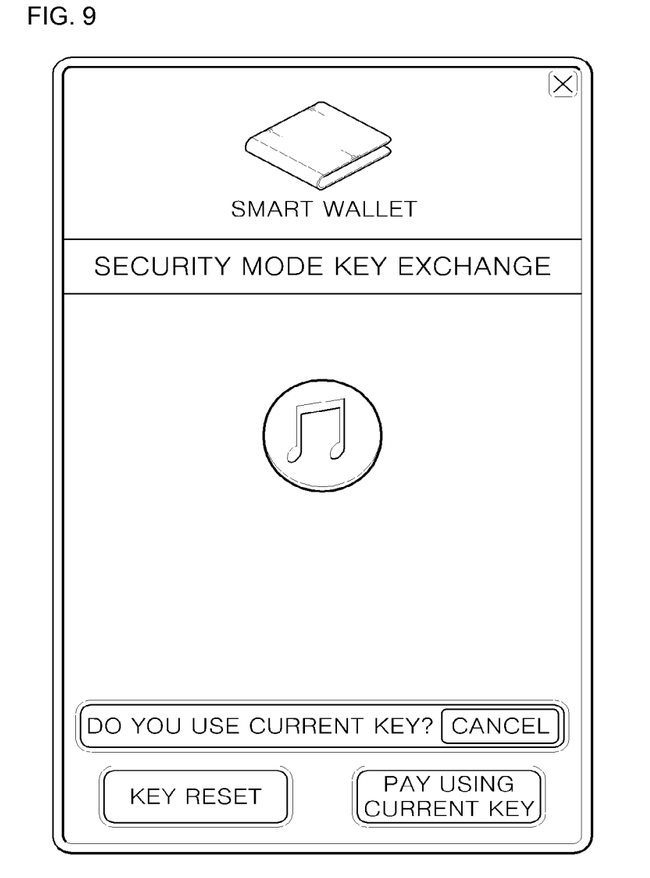
FIG. 9 illustrates a screen on which a music file is played according to the medium value of an OOB function obtained using the operation of FIG. 8.

FIG. 8 is a view illustrating an operation of obtaining a medium value using a comparing music (CM) method by using the OOB converting unit according to another embodiment of the present invention. In more detail, the left drawing of FIG. 8 shows an operation of applying an authentication code CV to an OOB function, and the right drawing of FIG. 8 shows a case that a medium value O is generated in the form of an index of a music file through an OOB auditory channel. FIG. 9 illustrates a screen on which a music file is played according to the medium value of an OOB function obtained using the operation of FIG. 8.

According to the CM method, if the authentication code CV is input to the OOB converting unit 150, the OOB converting unit 150 obtains a medium value O in the form of an index of a music file from a k-bit authentication code. Then, a music file way stored in a wireless communication terminal is played according to an index value. Here, if the authentication code is k-bit, $2^k$ music files are stored. For example, if the authentication code CV is 0011, a music file corresponding to a third index that corresponds to a decimal number value of the authentication code CV, is played. Thus, the user can conveniently check exchange of a session key only from short melody.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of sharing a session key between wireless communication terminals based on a Diffie-Hellman (DH) protocol, the method comprising:
generating a public key by using an own private key;
generating a message including the public key and a first random number;
encoding the message using an own secret key to exchange an encrypted message with the other terminal, wherein the message further comprises an identifier and a reflection attack verification value and wherein the secret key is a disposable key;
decoding the encrypted message of the other terminal by receiving a secret key of the other terminal;
checking the reflection attack verification value of the other terminal included in the decoded message;
generating an authentication code by calculating the first random number and a second random number included in the decoded message, wherein the first and second random numbers are comprised of bit streams having a value of 0 or 1, wherein the generating of the authentication code comprises performing an exclusive OR operation on the first random number and the second random number, wherein the authentication code is divided into n bits (where n is a natural number of 2 or more), wherein the divided authentication code corresponds to one grid, and wherein each grid is indicated by one color;
obtaining a medium value from the authenticated code; and
generating a session key by using the public key included in the decoded message of the other terminal,
wherein the obtaining of the medium value from the authentication code comprises:
dividing the authentication code into 2 or more bits and inputting the divided authentication code to an out-of-band (OOB) function to obtain the medium value; and
displaying the medium value on a screen including a plurality of grids,
wherein the number S' of grids required to display the medium value is obtained by the following equation:

$$S' = \frac{S}{\log_2 k}$$

where S is the number of grids required when the number of colors for displaying the medium value is 2, k is the number of colors used to display the medium value and is $2^m$ (where m is a number of bits to the divided authentication code).

2. The method of claim 1, wherein the obtaining of the medium value from the authentication code comprises:
inputting the authentication code to an OOB function to obtain the medium value; and
controlling a plurality of light emitting diodes (LEDs) to turn on or off according to the medium value.

3. The method of claim 1, wherein the obtaining of the medium value from the authentication code comprises:
inputting the authentication code to an OOB function to obtain the medium value; and
playing a stored sound source file according to the medium value.

4. A wireless communication terminal for sharing a session key with the other terminal based on a Diffie-Hellman (DH) protocol, the wireless communication terminal comprising:
at least one hardware processor;
a storage unit configured to store a public key generated by using an own private key using the at least one hardware processor;
an encoding unit configured to generate a message including the public key and a first random number and encode the message using an own secret key to exchange an encrypted message with the other terminal using the at least one hardware processor, wherein the message further comprises an identifier and a reflection attack verification value and wherein the secret key is a disposable key;
a decoding unit configured to decode the encrypted message of the other terminal by receiving a secret key of the other terminal using the at least one hardware processor, wherein the decoding unit checks the reflection attack verification value of the other terminal included in the decoded message;
an authentication code generating unit configured to generate an authentication code by calculating the first random number and a second random number included in the decoded message using the at least one hardware processor, wherein the first and second random numbers are comprised of bit streams having a value of 0 or 1, wherein the authentication code generating unit generates an authentication code by performing an exclusive OR operation on the first random number and the second random number, wherein the authentication code is divided into n bits (where n is a natural number of 2 or more), wherein the divided authentication code corresponds to one grid, wherein each grid is indicated by one color;
an out-of-band (OOB) converting unit configured to obtain a medium value from the authenticated code using the at least one hardware processor; and
a session key generating unit configured to generate a session key by using a public key included in the decoded message of the other terminal using the at least one hardware processor,
wherein the OOB converting unit obtains the medium value from the authentication code divided into 2 or more bits and inputted to the OOB converting unit and displays the medium on a screen including a plurality of grids,
wherein the number S' of grids required to display the medium value is obtained by the following equation:

$$S' = \frac{S}{\log_2 k}$$

where S is the number of grids required when the number of colors for displaying the medium value is 2, k is the number of colors used to display the medium value and is $2^m$ (where m is a number of bits to the divided authentication code).

* * * * *